(12) United States Patent
Stanley

(10) Patent No.: US 10,595,521 B2
(45) Date of Patent: Mar. 24, 2020

(54) FISHING LURE STORAGE CONTAINER

(71) Applicant: Plan D Fishing Solutions, LLC, Gig Harbor, WA (US)

(72) Inventor: Dylan Stanley, Gig Harbor, WA (US)

(73) Assignee: Plan D Fishing Solutions, LLC, Gig Harbor, WA (US)

( * ) Notice: Subject to any disclaimer, the term of this patent is extended or adjusted under 35 U.S.C. 154(b) by 381 days.

(21) Appl. No.: 14/871,687

(22) Filed: Sep. 30, 2015

(65) Prior Publication Data
US 2017/0086441 A1 Mar. 30, 2017

(51) Int. Cl.
*A01K 97/06* (2006.01)

(52) U.S. Cl.
CPC .................... *A01K 97/06* (2013.01)

(58) Field of Classification Search
CPC ..................................... A01K 97/06
See application file for complete search history.

(56) References Cited

U.S. PATENT DOCUMENTS

| | | |
|---|---|---|
| 1,749,227 A | 3/1930 | Pruett |
| 2,065,234 A | 12/1936 | Martinez |
| 2,173,366 A | 9/1939 | Hillmer |
| 2,533,865 A | 12/1950 | Wynne, Sr. et al. |
| 2,801,492 A | 8/1957 | Katwyk et al. |
| 2,846,806 A | 8/1958 | Gaines |
| 2,924,908 A | 2/1960 | Lisowy |
| 3,115,723 A | 12/1963 | Kline |
| 3,159,441 A | 12/1964 | Sikma |
| 3,180,053 A | 4/1965 | Norton et al. |
| 3,336,693 A | 8/1967 | Lussier |
| 3,570,173 A | 3/1971 | Case |
| 3,713,244 A | 1/1973 | Alotta |
| 3,985,409 A | 10/1976 | Kneier |
| 4,073,085 A | 2/1978 | Stremeckus |
| 4,176,491 A * | 12/1979 | Herring ................. A01K 97/06 43/57.1 |
| 4,372,073 A | 2/1983 | Goldman |

(Continued)

FOREIGN PATENT DOCUMENTS

| | | |
|---|---|---|
| DE | 20310337 | 10/2003 |
| GB | 698318 A | 10/1983 |

(Continued)

OTHER PUBLICATIONS

International Search Report and Written Opinion dated Dec. 19, 2016, International Application No. PCT/US16/52704, International Filing Date Sep. 20, 2016; pp. 1-12.

(Continued)

*Primary Examiner* — Jessica B Wong
(74) *Attorney, Agent, or Firm* — FisherBroyles LLP; Kevin D. Jablonski

(57) ABSTRACT

A storage container commonly referred to a "tackle box," that detachably secures an elongate fishing lure, such as a tube fly or the like, within a chamber of a case using a mandrel for detachably engaging the lure and a mandrel anchor for detachably engaging the mandrel. In a disclosed embodiment, the mandrel anchor is formed of foam with slits received therein for receiving one or more mandrels. A distal end of each mandrel may include a clip for snugly engaging the lure to further hold the lure in place in the container.

17 Claims, 4 Drawing Sheets

(56) References Cited

U.S. PATENT DOCUMENTS

| | | | |
|---|---|---|---|
| 4,653,220 A | 3/1987 | Olsen, Sr. | |
| 4,829,699 A | 5/1989 | Perkins | |
| 6,231,584 B1 | 5/2001 | Gavronsky | |
| 6,233,863 B1 | 5/2001 | Dotson | |
| 6,427,834 B1 | 8/2002 | Lin | |
| 7,621,074 B2 | 11/2009 | Glidewell et al. | |
| 2003/0163945 A1* | 9/2003 | Okada | A01K 85/08 |
| | | | 43/42.36 |
| 2004/0231225 A1 | 11/2004 | Okada | |
| 2008/0289988 A1 | 11/2008 | Sorensen | |
| 2009/0321456 A1 | 12/2009 | Yang | |
| 2010/0170139 A1 | 7/2010 | Zhou | |
| 2016/0015017 A1* | 1/2016 | Heaton | A01K 97/06 |
| | | | 43/54.1 |

FOREIGN PATENT DOCUMENTS

| | | | | |
|---|---|---|---|---|
| GB | 2324234 A | * | 10/1998 | A01K 97/06 |
| JP | 2001204338 A | | 7/2001 | |

OTHER PUBLICATIONS

European Patent Office; Extended European Search Report dated Apr. 17, 2019; EP Application No. 16852319.9; pp. 1-15.

\* cited by examiner

FISHING LURE STORAGE CONTAINER

FIELD OF THE INVENTION

This invention relates to a fishing tackle storage container. In particular, it relates to a storage container for securely storing and easily retrieving fishing tackle such as tube fly lures and the like.

BACKGROUND OF THE INVENTION

Containers for storing fishing tackle are often referred to as "tackle boxes." These containers usually contain a closable outer case that opens to reveal an interior chamber for storing fishing tackle, such as fishing lures and the like, therein. An exemplar tackle box can be found in U.S. Pat. No. 3,985,409 to Kneier, the disclosure of which is hereby incorporated by reference. It features a hard-shelled case with a pivoting lid that opens to reveal the interior chamber. Inside the camber is a plurality of individual compartments sized to receive an individual fishing lure therein.

Despite the benefits of this type of tackle box, it has several drawbacks. For example, lures stored in the individual chambers tend to move around as the tackle box is moved. This movement allows the lures to become tangled with other items in the compartment. Also, many lures have sharp hooks attached to them, and these hooks remain exposed while the lure is in the compartment. Accordingly, a person seeking to remove a lure from the compartment may inadvertently injure themselves on the lure's hook while attempting to retrieve it.

Efforts have been made to safety store hooked lures to prevent injuries when attempting to retrieve them from a tackle box. These tackle boxes basically secure the hooks of the lure to the tackle box, rather than simply storing the entire lure in a compartment in the box.

In general, these types of tackle boxes secure the hook or hooks of the lure in one of two ways. One way is by hanging the lure in the box by the hook or hooks. U.S. Pat. No. 1,749,227 to Pruett, and U.S. Pat. No. 2,801,492 to Katwyk et al, the disclosures of which are hereby incorporated by reference, are examples of tackle boxes that hang a lure by its hooks for storage. The other way is to insert the hook of a lure into a slot formed in a resilient foam pad secured to a wall on the tackle box case. Published U.S. patent application publication number 2008/0289988, the disclosure of which is hereby incorporated by reference, is an example of this type of fishing lure hook securing structure.

Despite the improvements offered by these types of tackle boxes, they still have several drawbacks. For example, some fishing lures are elongate flexible structures that do not have any hooks on them. These types of lures are often called "tube flies." They have an elongate tube with ornamental materials such as fringe and feathers attached thereto. During use, a fishing line is threaded through the tube of the tube fly and a hook is attached to the end of the line thereby "rigging" the lure for fishing.

Tube flies tend to become knotted and tangled when stored in a compartment in conventional tackle boxes. Moreover, because they do not usually have a hook attached to them, they cannot be stored by their hooks in tackle boxes designed to hold lures by their hooks.

Similarly, some lures containing hooks are formed of two articulated structures, each containing at least one hook. Known tackle boxes do not effectively hold these types of lures.

SUMMARY OF THE INVENTION

The present invention overcomes these issues with conventional tackle boxes.

In disclosed embodiments a storage container, commonly referred to a "tackle box," is disclosed that detachably secures an elongate fishing lure, such as a tube fly or the like, within a chamber of a case using a mandrel for detachably engaging the lure and a mandrel anchor for detachably engaging the mandrel. In a disclosed embodiment, the mandrel anchor is formed of foam with slits received therein for receiving one or more mandrels. A distal end of each mandrel may include a clip for snugly engaging the lure to further hold the lure in place in the container.

The foregoing and other objectives, features, and advantages of the invention will be more readily understood upon consideration of the following detailed description of the invention taken in conjunction with the accompanying drawings.

DETAILED DESCRIPTION OF PREFERRED EMBODIMENTS

Figure 6:
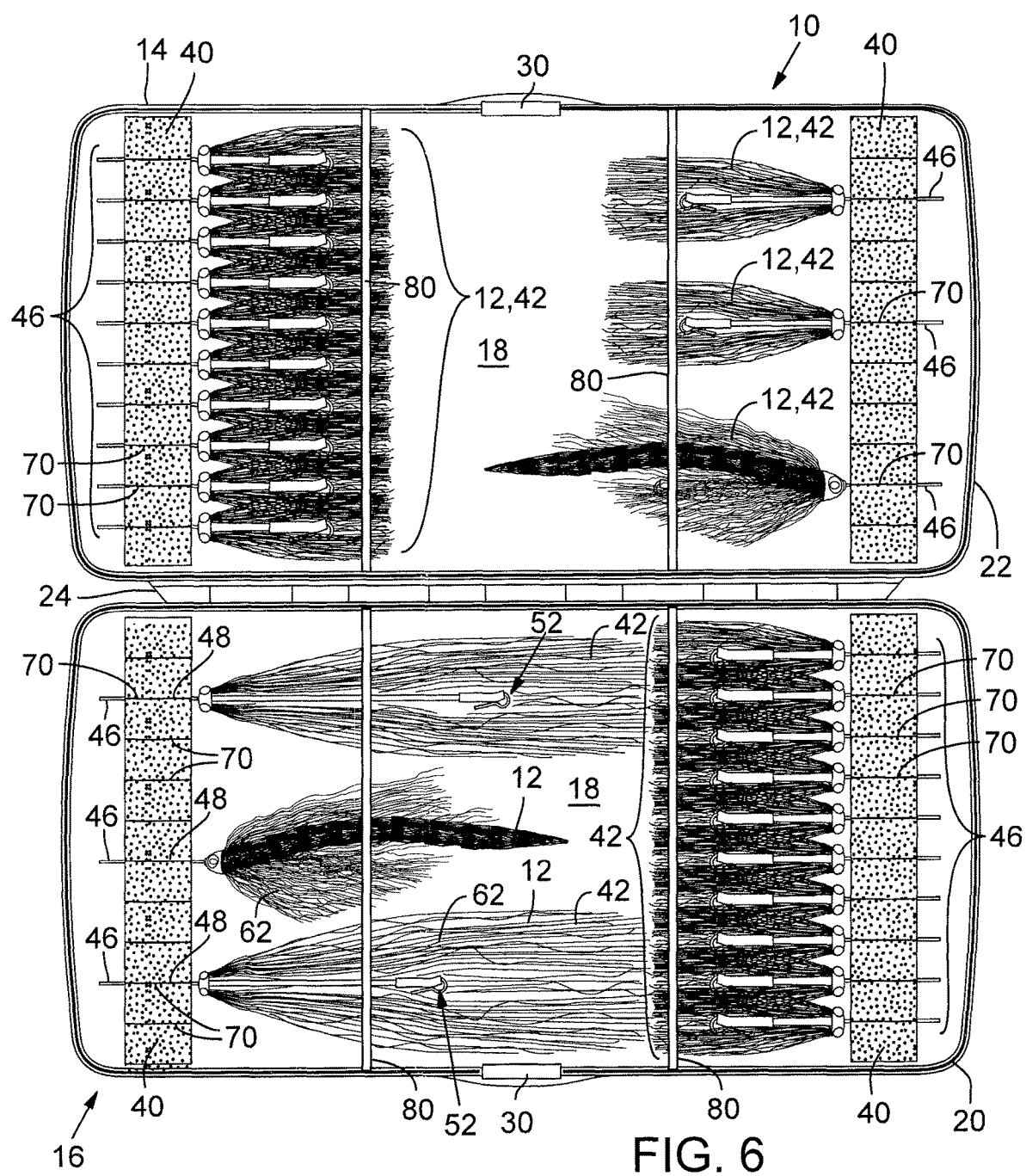
FIG. 6 is a top view of a fishing lure storage container in accordance with an embodiment of the present invention showing a possible open position of the container revealing a possible plurality of elongate mandrels of FIGS. 1 & 4 operably secured within the container.
Figure 7:
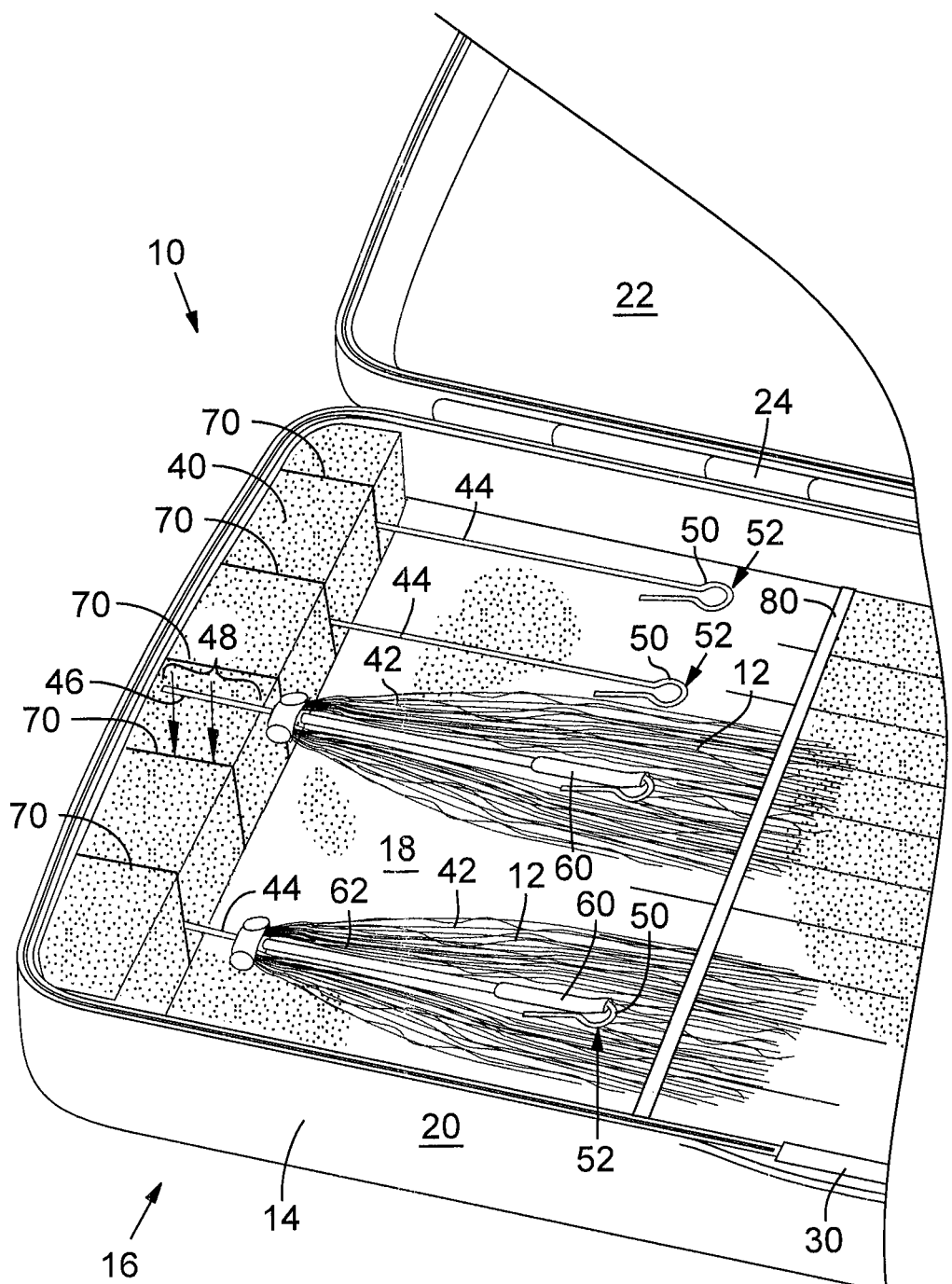
FIG. 7 is an enlarged, top, fragmentary, isometric view of an alternative possible fishing lure storage container in accordance with an alternative embodiment of the present invention showing a plurality of mandrels, some of which containing tube flies thereon, operably secured therein.
Figure 8:
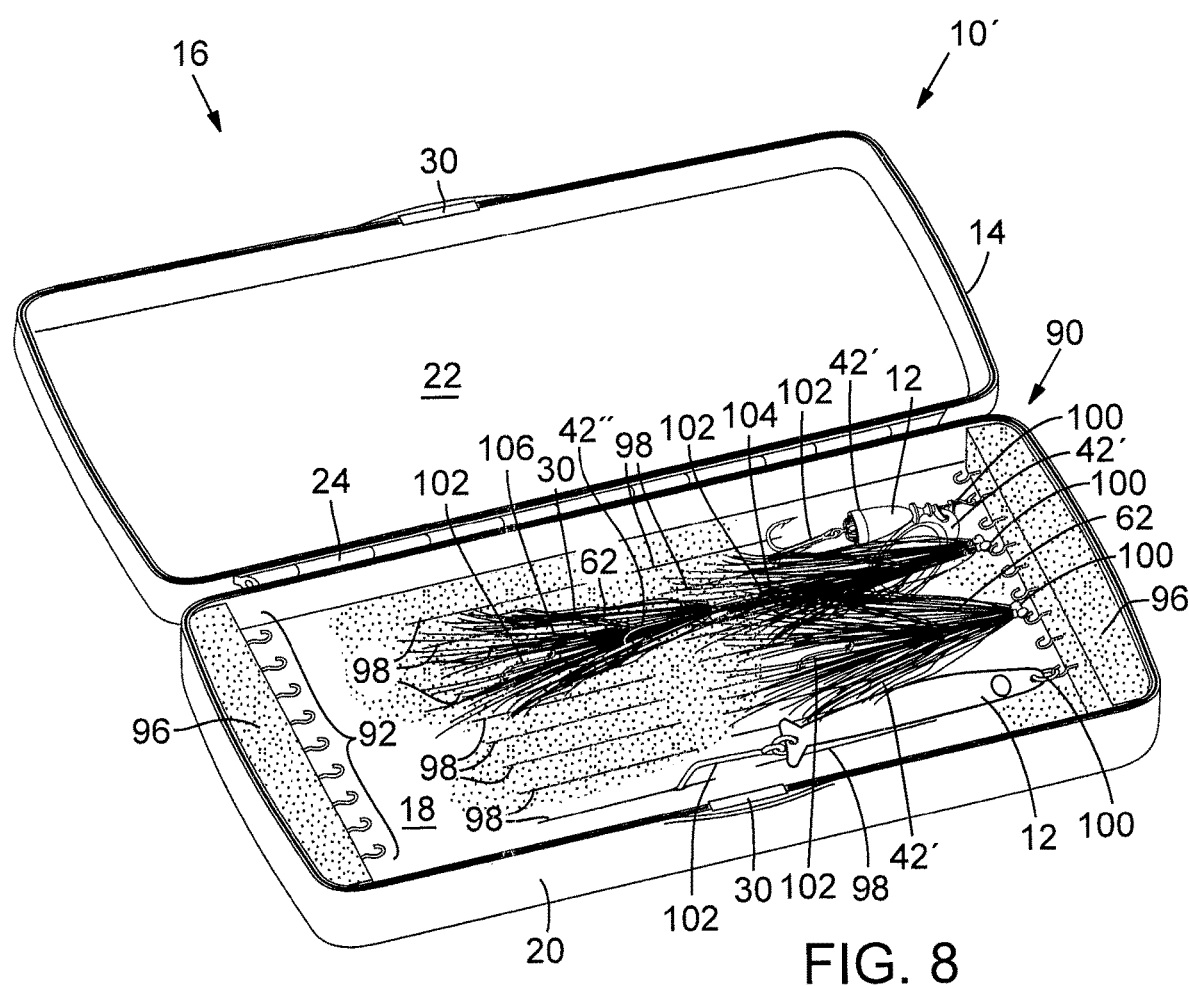
FIG. 8 is a top, isometric view on an alternative possible fishing lure storage container in accordance with an alternative embodiment of the present invention.

A fishing lure storage container 10 for storing fishing tackle such as fishing lures 12 and the like therein is disclosed in the attached figures. A first storage container 10 embodiment is shown in FIGS. 6 & 7 and a second storage container 10' embodiment is shown in FIG. 8. Both embodiments are discussed in greater detail below.

Referring to FIGS. 6 & 7, the fishing lure storage container 10 preferably includes a case 14 that has an open position 16 shown in FIGS. 6 and 7 to reveal and make accessible an interior chamber 18 for receiving fishing lures 12 and the like therein and a closed position (not shown) wherein the chamber 18 is inaccessible.

One possible case 14 structure includes a base portion 20 and a lid portion 22 pivotally secured to the base portion 20 at a hinge 24. The lid portion 22 pivots about the hinge 24 to define the open position 16 when the lid portion 22 is pivoted away from the base portion 20 and the closed position where the lid portion 22 is pivoted to rest on top of the base portion 20.

A locking structure 30 may be provided to detachably lock the lid portion 22 to the base portion 20 when the case 14 is in the closed position. If desired, a seal (not shown) may be provided between the lid portion 22 and base portion 20 so as to make the case 14 water tight when the case 14 is in the closed position.

The case's 14 structure may be formed with a variety of flexible and rigid materials such as plastic, fabric or the like. Preferably, the case structure is suitably rigid so as to allow resilient mandrel anchors 40 to be operably secured thereto.

Figure 1:
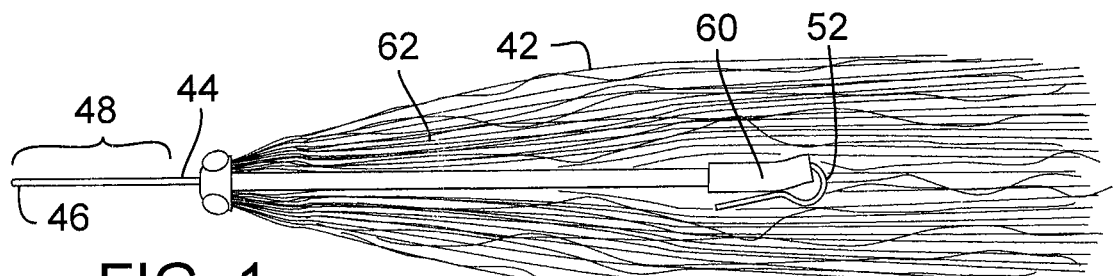
FIG. 1 is a side view of a tube fly operably received on an elongate mandrel with a holding clip formed on its distal end in accordance with an embodiment of the present invention.
Figure 2:
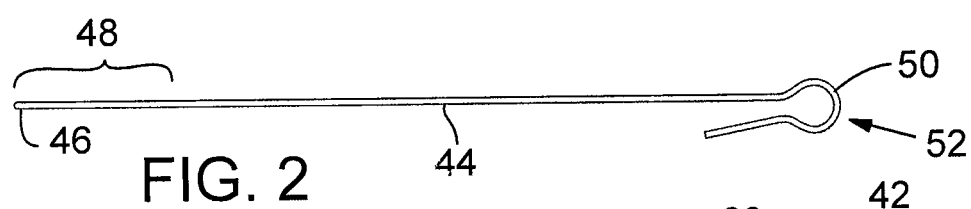
FIG. 2 is a side view of the mandrel of FIG. 1.

Referring to FIGS. 1-4, a tube fly 42 detachably secured to a mandrel 44 is shown. As shown in FIG. 2, the mandrel 44 is preferably an elongate structure having a first end 46 that has a substantially straight portion 48 and an opposite second end 50 with a curved clip 52 formed thereon. The mandrel 44 is preferably formed of a strong, rust and water resistant material, such as steel or the like.

Figure 3:
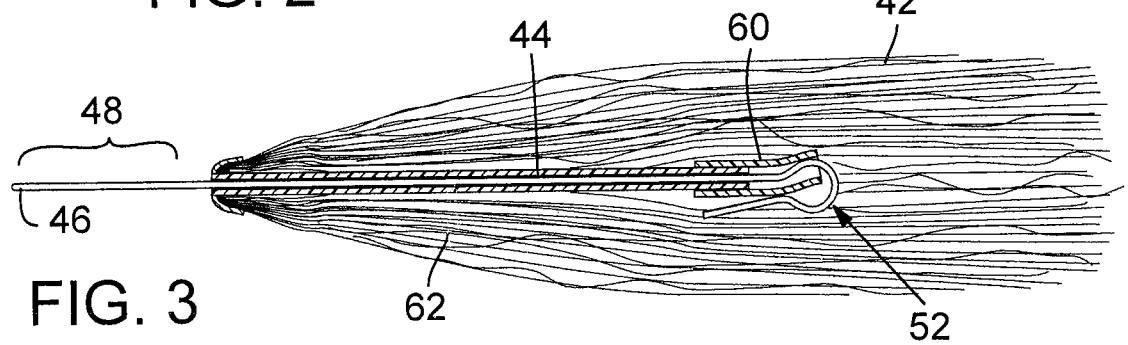
FIG. 3 is a cross-sectional view of the tube fly of FIG. 1 showing interior detail of possible orientation relative to the mandrel.

As best shown in FIG. 3, a conventional tube fly 42 has an elongate hollow tube 60 with ornamental materials 62 such as fringe and other materials operably secured thereto. An alternative style of tube fly 42' having an elongate hollow tube 60 therein is shown in FIGS. 4 and 5.

The first end 46 of the mandrel 44 is inserted into the tube 60 of the tube fly 42 and the mandrel 44 is slid through the tube 60 until the curved clip 52 operably engages and holds one end of the tube fly's tube 60 as best shown in FIG. 3. The curved clip 52 is sized so as to tightly engage the wan of the tube 60 of the tube fly 42, thereby preventing the tube fly 42 from sliding up and down when secured on the mandrel 44.

Figure 4:
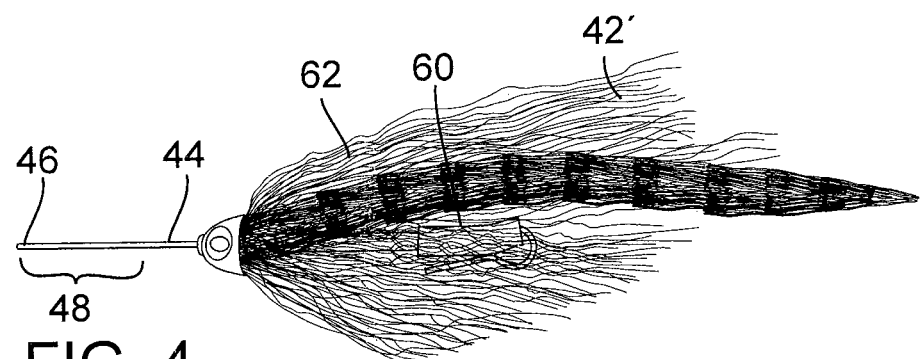
FIG. 4 is a side view of an alternative style tube fly operably received on a mandrel in accordance with an embodiment of the present invention.
Figure 5:
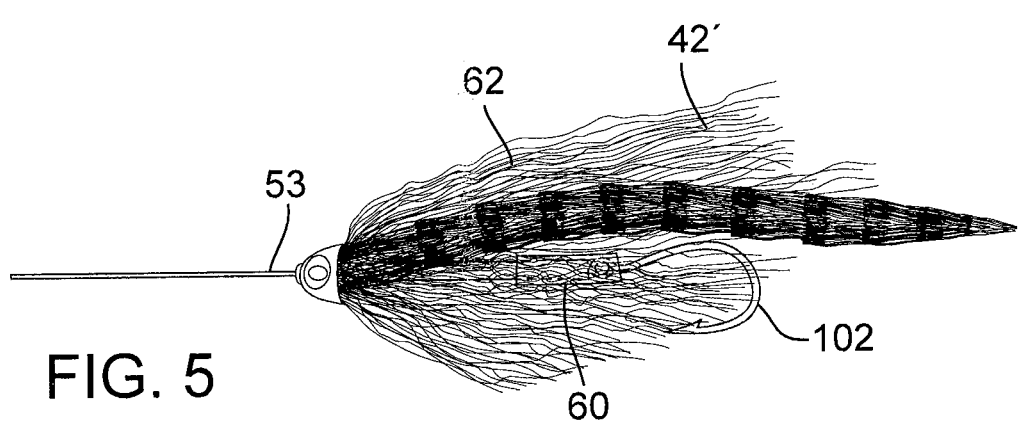
FIG. 5 is a side view of the tube fly of FIG. 4 removed from the mandrel of FIG. 4 and shown with a possible fishing line extending through the tube of the tube fly and rigged with a hook in accordance with an embodiment of the present invention.

Referring to FIGS. 4 & 5, a user can rig a tube fly 42' by removing it from the mandrel 44 (FIG. 4) and threading a fishing line 53 (FIG. 5) through the tube 60 of the tube fly 42'. A hook 102 is then secured to the end of the fishing line 53 and the fishing line 53 is pulled so that the hook 102 is positioned adjacent to the tube fly 42' as shown in FIG. 5.

Referring to FIGS. 6 & 7, the resilient mandrel anchors 40 are operably secured toward at least one side of the chamber 18 within the case 14. Both left and right sides of the top and base portion of the case 14 structure are shown bearing mandrel anchors 40 in these figures. Each mandrel anchor 40 is formed of resilient material and includes at least one mandrel engaging portion 70 for detachably securing the first end 46 of a mandrel 44 therein.

Preferably, the mandrel anchors 40 are formed of resilient foam and the mandrel engaging portion 70 is a slit formed within the foam. More preferably, the foam is closed cell, water resilient foam. Other resilient materials such as silicone, rubber, an elongate coil spring and the like may be used as desired.

Referring to FIG. 7, a plurality of parallelly aligned and spaced apart slits are provided in the resilient mandrel anchor 40. Each slit serves as a possible mandrel engaging portion 70 for receiving a mandrel 44 therein and is aligned so that the remaining portion of each mandrel 44 extends inward toward the chamber 18 in the case 14 as shown. After a user operably secures a tube fly 42 to a mandrel 44 as previously described, he or she positions the first end 46 of the mandrel 44 over an available slit as shown. He or she then moves the mandrel 44 into the slit thereby securing the tube fly 42 in the chamber 18 of the case 14. Unused mandrels 44 can be stored in an available slit until they are needed. An optional elastic strap 80 may be extended across the chamber 18 over the secured tube flies 42 to further secure the tube flies 42 in place.

Should a user need a particular tube fly 42 from the container 10, he or she simply lifts the mandrel 44 containing the desired tube fly 42 from its position on the mandrel anchor 40 and then slides the mandrel 44 out of the tube fly's tube 60.

Referring to FIG. 8 an alternative possible fishing lure 10' storage container is disclosed. It features the case 14 of the earlier embodiment but includes an alternative possible lure anchoring structure 90. At least one side of the case 14 includes one or more lure engaging hooks 92 extending inward toward the chamber 18 as shown. The floor 94 of the chamber 18 includes a resilient material 96, which is preferably foam that has one or more elongate slits 98 aligned with the lure engaging hook 92.

Accordingly, a conventional hooked fishing lure 42' may be safely secured within the chamber 18 by a user first positioning the eyelet 100 of a conventional fishing lure 42' on a lure engaging hook 92 of the container 10', then inserting the hooks 102 on the lure 42' into the aligned slit or slits 98 as shown. It can be appreciated that an articulated lure 42" can be stored in the container 10' by securing hooks 102 extending from both the front portion 104 and rear portion 106 of the articulated lure 42' into the aligned slit or slits 98.

Preferably, a plurality of lure-engaging hooks 92 is positioned spaced apart from each other as shown in FIG. 8. Accordingly, a related plurality of parallelly aligned and spaced apart slits 98 are provided to allow each lure engaging hook 92 to operably hold a lure 42' as previously described. In addition, if desired, the features of the first disclosed embodiment shown in FIGS. 1-7 and the features of the second disclosed embodiment shown in FIG. 8 can be combined into a single fishing lure container.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A container for storing a fishing lure, the container comprising:
   a case defining a chamber therein, the case having an open position whereby the chamber is accessible and a closed position whereby the chamber is inaccessible;
   an elongate mandrel having a first end that is substantially straight and an opposite second end adapted to detachably engage the fishing lure such that the fishing lure engages exclusively with the mandrel; and
   a resilient mandrel anchor operably secured to the case within the chamber, the mandrel anchor having a mandrel engaging portion for detachably engaging the first end of the mandrel while extended through a hollow tube of the fishing lure such that the fishing lure is prevented from extending beyond the first end of the mandrel while engaged with the mandrel anchor;
   whereby the mandrel is detachably secured to the mandrel engaging portion of the resilient mandrel anchor within the chamber so that the mandrel remains engaged with the fishing lure when the mandrel is engaged with the mandrel engaging portion and also remains extended through the hollow tube of the fishing lure when the mandrel is separated from the mandrel engaging portion.

2. The container for storing a fishing lure of claim 1, wherein the resilient mandrel anchor comprises foam and the mandrel engaging portion comprises a slit in the foam.

3. The container for storing a fishing lure of claim 1, wherein:
the case has a side;
the resilient mandrel anchor is secured toward that side; and the first end of the mandrel is detachably secured to the mandrel engaging portion.

4. The container for storing a fishing lure of claim 1, wherein the opposite second end includes a clip.

5. The container for storing a fishing lure of claim 1, wherein the fishing lure comprises a tube fly encompassing the hollow tube, and the mandrel is operably received within the hollow tube.

6. The container for storing a fishing lure of claim 5, wherein the tube of the tube fly has a wall and the opposite second end of the mandrel contains a clip that operably engages the wall of the tube when the fishing lure is detachably secured to the mandrel.

7. The container for storing a fishing lure of claim 1, wherein the resilient mandrel anchor includes a plurality of mandrel engaging portions, each mandrel engaging portion adapted to detachably engage a mandrel therein, thereby allowing a plurality of fishing lures to be detachably received within the chamber.

8. The container for storing a fishing lure of claim 7, wherein the mandrel engaging portions comprise spaced apart slits that are substantially aligned parallel to each other.

9. The container for storing a fishing lure of claim 8, wherein the resilient mandrel anchor comprises foam.

10. The container for storing a fishing lure of claim 9, wherein the foam comprises closed cell foam.

11. A container for storing an elongate tube fly therein, the container comprising:
a case defining a chamber therein, the case having an open position whereby the chamber is accessible and a closed position whereby the chamber is inaccessible;
an elongate mandrel having a first end and an opposite second end, the first end being substantially straight, the opposite second end having a clip portion sized to a tube fly having a hollow tube configured to receive the mandrel through the hollow tube such that the clip portion prevents the hollow tube from extending beyond the second end of the mandrel; and
a resilient mandrel anchor operably secured to the case within the chamber, the mandrel anchor having a mandrel engaging portion for detachably engaging the first end of the mandrel while extended through the hollow tube such that the tube fly is prevented from extending beyond the first end of the mandrel while engaged with the mandrel anchor;
whereby the mandrel is detachably secured to the mandrel engaging portion of the resilient mandrel anchor within the chamber so that the mandrel remains extended through the hollow tube when engaged with the mandrel engaging portion and remains extended through the hollow tube when separated from the mandrel engaging portion while allowing the tube fly to be removed from the mandrel once free from the resilient mandrel anchor.

12. The container for storing an elongate tube fly of claim 11, wherein the resilient mandrel anchor comprises foam and the mandrel engaging portion is a slit in the foam.

13. The container for storing a fishing lure of claim 12, wherein the case has a side and the resilient mandrel anchor is secured toward that side such that the opposite second end of the mandrel extends into the chamber when the first end of the mandrel is detachably secured to the mandrel anchor.

14. The container for storing a fishing lure of claim 11, wherein the mandrel engaging portion further comprises a plurality of slits, each adapted to detachably receive a mandrel therein.

15. The container for storing a fishing lure of claim 14, wherein each slit in the plurality of slits is aligned parallel to and spaced apart from each other.

16. The container for storing a fishing lure of claim 11, wherein the mandrel comprises a single elongate member that extends from the first end of the hollow tube the second end of the hollow tube.

17. The container for storing a fishing lure of claim 11, wherein the tube fly is engaged by one and only one mandrel.

* * * * *